United States Patent

Zaidener

[15] 3,664,164

[45] May 23, 1972

[54] LOCKING MECHANISMS

[72] Inventor: Kitty Zaidener, 36, Hamiton Court, Maida Vale, London, W. 9, England

[22] Filed: Oct. 13, 1970

[21] Appl. No.: 80,316

[30] Foreign Application Priority Data

Apr. 8, 1970    Great Britain..................16,783/70

[52] U.S. Cl.........................70/202, 70/14, 70/211, 70/238
[51] Int. Cl.........................................B60r 25/02
[58] Field of Search..............70/202, 211, 238, 199, 209, 70/19, 14, 39

[56] References Cited

UNITED STATES PATENTS

| | | | |
|---|---|---|---|
| 1,530,177 | 3/1925 | Heyer | 70/39 |
| 1,864,883 | 6/1932 | Anderson | 70/14 |
| 2,140,066 | 12/1938 | White | 70/14 |
| 1,098,103 | 5/1914 | Freschl | 70/19 X |
| 3,245,239 | 4/1966 | Zaidener | 70/202 |
| 3,462,982 | 8/1969 | Moore | 70/209 |
| 3,504,405 | 4/1970 | Elliott-Smith | 70/14 X |

FOREIGN PATENTS OR APPLICATIONS

| | | | |
|---|---|---|---|
| 716,436 | 12/1931 | France | 70/34 |
| 1,026,347 | 4/1953 | France | 70/14 |

*Primary Examiner*—Albert G. Craig, Jr.
*Attorney*—Strauch, Nolan, Neale, Nies & Kurz

[57] ABSTRACT

A locking mechanism particularly applicable to vehicle anti-theft devices comprises two telescopic members one of which has a series of recesses and the other of which has a detent spring urged into engagement with said recesses. The detent is mounted for angular movement into said recesses whereby it locks the two members against relative movement in one direction by a wedging action while permitting movement in the other and means operable for example by a key is provided to release the members for movement in both directions by moving said detent against the spring loading.

5 Claims, 4 Drawing Figures

PATENTED MAY 23 1972

3,664,164

INVENTOR
KITTY ZAIDENER

BY Strauch, Nolan, Neale, Nies & Kurz
STRAUCH, NOLAN, NEALE, NIES & KURZ

LOCKING MECHANISMS

BACKGROUND OF THE INVENTION

This invention relates to locking mechanisms which have particular application to vehicle anti-theft devices such as are described in the specifications of my British Pats. No. 1,007,711, No. 1,039,980 and No. 1,107,012.

In one form of anti-theft device, telescopic members are locked together by a cam-operated ball which, in the unlocked state, allows the movable member to slide in a series of steps; this form of device involves separate actions in locking and unlocking. In another form of anti-theft device, a spring-loaded pawl is provided to give a ratchet effect, but this involves the disadvantage of requiring the lock to be held continuously in the "free" position during retraction of the movable member.

SUMMARY OF THE INVENTION

It is an object of the present invention to overcome the above disadvantages by providing a simple and effective locking mechanism, primarily intended to be operated by a key, to allow or prevent movement between two telescopic members.

It is a further object of the invention to provide such a locking mechanism which has a spring-loaded detent on one of said members and a series of locking recesses on the other which cooperate to provide a ratchet effect, and which has a construction such that the recesses may be in the form of easily machined depressions rather than ratchet teeth.

It is a still further object of the invention to provide such a locking mechanism with a key-operated means for holding said detent in released and locking positions and having stable released and locking positions.

DETAILED DESCRIPTION OF THE DRAWINGS

Figure 1:
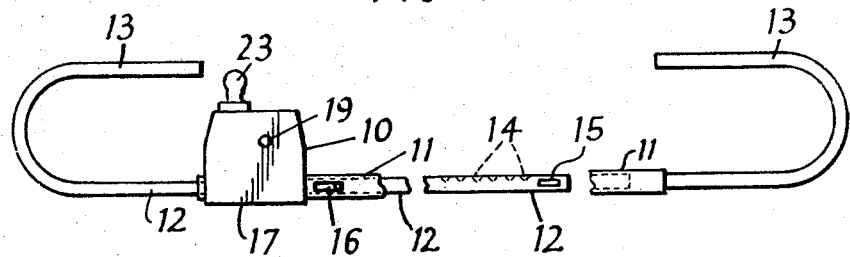
FIG. 1 is a side elevation showing an anti-theft device for a road vehicle.
Figure 4:
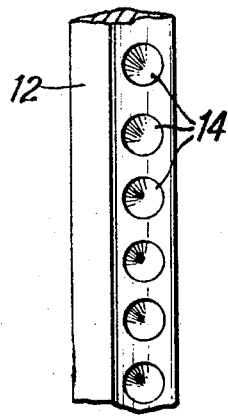

Referring to the drawings, the locking mechanism 10 is securely mounted at the open end of tubular member 11 of the anti-theft device. As described in my aforementioned patents, the anti-theft device comprises the tubular member 11, a square-section rod 12, and hooked parts 13 provided at the ends of the telescopic members 11 and 12.

The square-section rod 12 is formed with a series of conical recesses 14 and, in its side, is formed with a notch 15 arranged to be engaged by a finger carried at the end of a leaf spring 16 to prevent accidental complete withdrawal of the rod.

The locking mechanism 10 comprises a casing 17 in which a detent 18 is mounted on a pivot 19. The detent is urged towards the rod 12 by a compression spring 20 and an opening is provided in the tubular member 11 to allow end 21 of the detent to engage the recesses.

Figure 3:
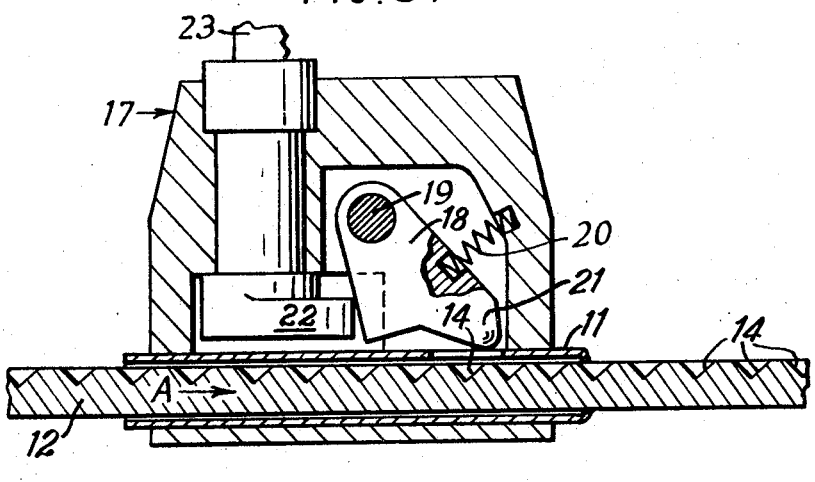
FIG. 3 is a sectional elevation of the parts shown in FIG. 2, showing the locking member of the locking mechanism; and, FIG. 4 is a partial perspective view in elevation showing a series of recesses on one of the members of the locking mechanism.

A disc-like cam 22 is mounted within the casing, on a vertical shaft, and can be rotated between two positions by means of a key 23. The cam is arranged to engage the body of the detent 18 so that, in the cam position shown in FIG. 3, the detent is moved against spring action out of contact with the recesses 14.

Figure 2:
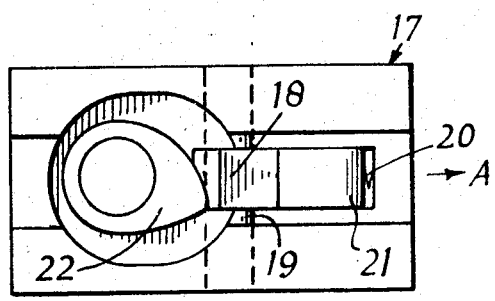
FIG. 2 is a sectional view of parts of the locking mechanism of the device shown in FIG. 1, viewed from below.

In operation of the device, in the unlocked position (FIG. 2) the rod 12 can be moved freely within the tube. On the other hand, when the cam 22 is turned to allow the detent to engage the recesses 14, the rod may be moved in the closing direction, i.e. arrow A, during which movement the detent 18 acts as a spring-loaded pawl to promote movement in a series of steps; however, on attempted movement of the rod in the direction opposite to arrow A, the detent enters a recess 14 and locks the rod against further movement and attempted forcing of movement in this direction forces the detent into more positive engagement with the recess in question.

It will be appreciated that, in its application to an anti-theft device of the kind described, the locking mechanism can be opened by simply turning the key whereupon the device can be removed; the mechanism is held frictionally in each of its two positions.

On the other hand, the device can be readily applied in its working position by turning the key to the "locked" position and then moving the telescopic parts together as far as possible; when the two hooks 13 engage the control pedal and the steering wheel of the vehicle, movement of the telescopic parts is stopped, and the parts cannot be moved apart due to the locking action of the detent.

Whereas prior art devices require sharply angled teeth edges in a rachet and pawl slip lock arrangement, the locking faces or reaction surfaces of each rachet tooth being set at at least a 90° angle with respect to direction of movement of the slip lock, it has been found in the operative parts of the present invention that a gently sloping reaction surface will still perform the desired function in a slip lock assembly. Thus, it will be noted that the locking recesses 14 may be formed by simply shallow drilling the face of rod 12 upon which the recesses are to be formed, thereby resulting in a considerable expense saving in that a row of carefully machined rachet teeth are unnecessary. Additionally, unlike prior art devices, no sharp teeth edges are exposed which might cause injury to the hands of the user of the invention.

Although the locking mechanism is described above with reference to anti-theft devices, it also has other applications in locking together other relatively movable mechanical parts.

What is claimed is:

1. An anti-theft device for a road vehicle having a steering wheel and at least one control pedal, comprising a first elongated part and a second elongated part telescopically receiving said first elongated part, a first shaped member at the outer end of one of said parts for receiving and holding a part of the steering wheel, a second shaped member at the outer end of the other of said parts for receiving and holding a part of the control pedal, said first elongated part having a series of conical recesses spaced therealong in the direction of telescopic movement, said second elongated part having a detent pivotally mounted thereon on an axis which is perpendicular to the direction of telescopic movement and spaced from said first elongated part, said detent having a working end spaced from said pivotal axis by a distance greater than the distance between said pivotal axis and a plane defined by the bottoms of said conical recesses, each of said recesses having a reaction surface arranged to mate with said detent working end, said reaction surface lying in a plane disposed substantially angularly outwardly with respect to a vertical line coincident with the shortest distance between said pivotal axis and said first elongated part, resilient means biasing said detent into engagement with said recesses, whereby upon telescopic movement of said first and second elongated parts away from each other, said detent working end and a recess reaction surface are wedged together to prevent such telescopic movement, and whereby upon telescopic movement of said elongated parts towards each other, said detent working end rides over said recesses against the force of said biasing means thereby permitting telescopic movement of said elongated parts towards each other, and lock controlled means for moving said detent against said biasing means to free said detent from said recesses.

2. An anti-theft device as claimed in claim 1, in which said lock controlled means for moving said detent comprise a rotary cam which is manually operable to hold said detent against the action of said biassing means.

3. An anti-theft device as claimed in claim 2, wherein said lock controlled means further comprise key-operated means to actuate said cam.

4. An anti-theft device as claimed in claim 1, in which said second elongated part comprises a tube, rectangular in cross-section, and said first elongated part comprises a rod, rectangular in cross-section and having external dimensions approximately equal the internal dimensions of said tube.

5. An anti-theft device as claimed in claim 4, wherein said conical recesses comprise means defining a plurality of aligned conical recesses formed in one surface of said rod, each having a vertical axis arranged substantially normal to said rod one surface.

* * * * *